US011420432B1

(12) United States Patent
Mojdehi et al.

(10) Patent No.: US 11,420,432 B1
(45) Date of Patent: Aug. 23, 2022

(54) METHOD AND APPARATUS FOR ADHESIVE DISPENSING

(71) Applicant: Ford Global Technologies, LLC, Dearborn, MI (US)

(72) Inventors: Ahmad Mojdehi, Ann Arbor, MI (US); David John Hill, Ann Arbor, MI (US); Anthony J. Grima, South Rockwood, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/229,516

(22) Filed: Apr. 13, 2021

(51) Int. Cl.
*B32B 41/00* (2006.01)
*B32B 37/12* (2006.01)

(52) U.S. Cl.
CPC .......... *B32B 37/1292* (2013.01); *B32B 41/00* (2013.01)

(58) Field of Classification Search
CPC .............................. B32B 37/1292; B32B 41/00
USPC ..................... 156/60, 64, 350, 351, 378, 379
See application file for complete search history.

(56) References Cited

U.S. PATENT DOCUMENTS

| 7,621,465 | B2 | 11/2009 | Riney |
| 9,126,751 | B2 | 9/2015 | Dorman et al. |
| 2010/0051638 | A1* | 3/2010 | Riney .................. B05B 7/0807 222/1 |
| 2015/0141538 | A1 | 5/2015 | Melendy et al. |
| 2020/0122189 | A1 | 4/2020 | Antonie |

OTHER PUBLICATIONS

Nordson Corporation, Adhesives & Sealants Guide, 12th Edition, 2018-2019, Nordson Corporation Publishing, 2014.

* cited by examiner

*Primary Examiner* — Michael N Orlando
*Assistant Examiner* — Joshel Rivera
(74) *Attorney, Agent, or Firm* — Burris Law, PLLC (57) ABSTRACT

A method of dispensing an adhesive on a substrate includes flowing an extrudate of the adhesive through a flow control valve and an application nozzle, and introducing a non-adhesive fluid into the extrudate within the flow control valve upstream from a distal end of the application nozzle such that the non-adhesive fluid interrupts a boundary layer of the extrudate and a non-contact cut of the extrudate is provided. The non-adhesive fluid can be air that forms a bubble in the extrudate of the adhesive flowing through the application nozzle and adhesive dispensed onto the substrate is free of a string and/or a teardrop.

20 Claims, 6 Drawing Sheets

METHOD AND APPARATUS FOR ADHESIVE DISPENSING

FIELD

The present disclosure relates to dispensing of adhesives, sealants, and mastics, and more particularly to a method and apparatus for reducing stringing during dispensing of adhesives, sealants and mastics.

BACKGROUND

The statements in this section merely provide background information related to the present disclosure and may not constitute prior art.

Adhesives, sealants and/or mastics (referred to herein collectively simply as "adhesive" or "adhesives") have a broad range of applications due to the ability of such materials to improve stiffness, durability, stress distribution, NVH (noise, vibration and harshness) and sealing compared to mechanical fasteners and/or welding. Proper dispensing of an adhesive is important in order for the dispensed material to perform as intended. However, in some applications a "string" of adhesive extends from a bead of adhesive that has been formed on a substrate. And in other applications a "teardrop" is formed on a button of adhesive that has been formed on a substrate.

The present disclosure addresses issues of defects in dispensed adhesives among other issues related to dispensing pumpable fluids.

SUMMARY

This section provides a general summary of the disclosure and is not a comprehensive disclosure of its full scope or all of its features.

In one form of the present disclosure, a method of dispensing an adhesive on a substrate includes flowing an extrudate of the adhesive through a flow control valve and an application nozzle, and introducing a non-adhesive fluid into the extrudate within the flow control valve upstream from a distal end of the application nozzle such that the non-adhesive fluid interrupts a boundary layer of the extrudate and a non-contact cut of the extrudate is provided.

In some variations, the non-adhesive fluid is air and in at least one variation the non-adhesive fluid forms a bubble in the extrudate of the adhesive flowing through the application nozzle. In some variations, the non-adhesive fluid is a liquid.

In at least one variation, the non-adhesive fluid introduced into the extrudate of the adhesive forms an air bubble between an adhesive reservoir within the flow control valve and a distal end of the application nozzle. In such variations the method can further include flowing the extrudate of the adhesive downstream of the air bubble out of the application nozzle and the adhesive dispensed onto the substrate is free of a string and/or a teardrop.

In some variations, the flow control valve comprises an adhesive flow valve and a non-adhesive flow valve. In such variations, the non-adhesive fluid introduced into the extrudate of the adhesive flows through the non-adhesive flow valve and into the extrudate downstream of the adhesive flow valve and upstream from a distal end of the application nozzle. In at least one variation, the adhesive flow valve moves from an open position to a closed position before the non-adhesive flow valve moves from a closed position to an open position. In some variations, a timing between moving the adhesive flow valve from the open position to the closed position and moving the non-adhesive flow valve from the closed position to the open position is adjusted as a function of at least one fluid property of the adhesive. Also, the timing between moving the adhesive flow valve from the open position to the closed position and moving the non-adhesive flow valve from the closed position to the open position can be adjusted by a controller. In such variations, the controller can adjust the timing between moving the adhesive flow valve from the open position to the closed position and moving the non-adhesive flow valve from the closed position to the open position as a function of a temperature of the extrudate of the adhesive flowing through the flow control valve and the application nozzle.

In at least one variation, at least one of a timing of introducing the non-adhesive fluid into the extrudate and a volume of the non-adhesive fluid introduced into the extrudate is adjusted in real-time as a function of a temperature of the extrudate.

In another form of the present disclosure, a method of dispensing an adhesive on a substrate includes flowing an extrudate of the adhesive through a flow control valve and an application nozzle and flowing air through a non-adhesive flow valve and introducing the air into the extrudate within the flow control valve and upstream a distal end of the application nozzle. The air interrupts a boundary layer of the extrudate and a non-contact cut of the extrudate is provided.

In some variations, the flow control valve includes an adhesive flow valve, and the method further includes moving the adhesive flow valve from an open position to a closed position, and moving the adhesive flow valve from a closed position to an open position such that the air introduced into the extrudate forms an air bubble in the extrudate flowing within the flow control valve and the application nozzle. And in some variations, the method includes a controller adjusting a timing between moving the adhesive flow valve from the open position to the closed position and moving the non-adhesive flow valve from the closed position to the open position as a function of at least one fluid property of the adhesive.

In still another form of the present disclosure, a method of dispensing an adhesive on a substrate includes flowing an extrudate of the adhesive through a flow control valve and an application nozzle, the flow control valve having an adhesive flow valve and a non-adhesive flow valve. The adhesive flow valve moves from an open position to a closed position and the non-adhesive flow valve moves from a closed position to an open position such that a gas flows through the non-adhesive flow valve and into the extrudate downstream of the adhesive flow valve and upstream from a distal end of the application nozzle. Also, the non-adhesive flow valve moves from the open position to the closed position and the adhesive flow valve moves from the closed position to the open position and the gas flowing into the extrudate interrupts a boundary layer of the extrudate such that a non-contact cut of the extrudate is provided.

In some variations, a timing between moving the adhesive flow valve from the open position to the closed position and moving the non-adhesive flow valve from the closed position to the open position is adjusted as a function of at least one fluid property of the adhesive flowing through the adhesive flow valve.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
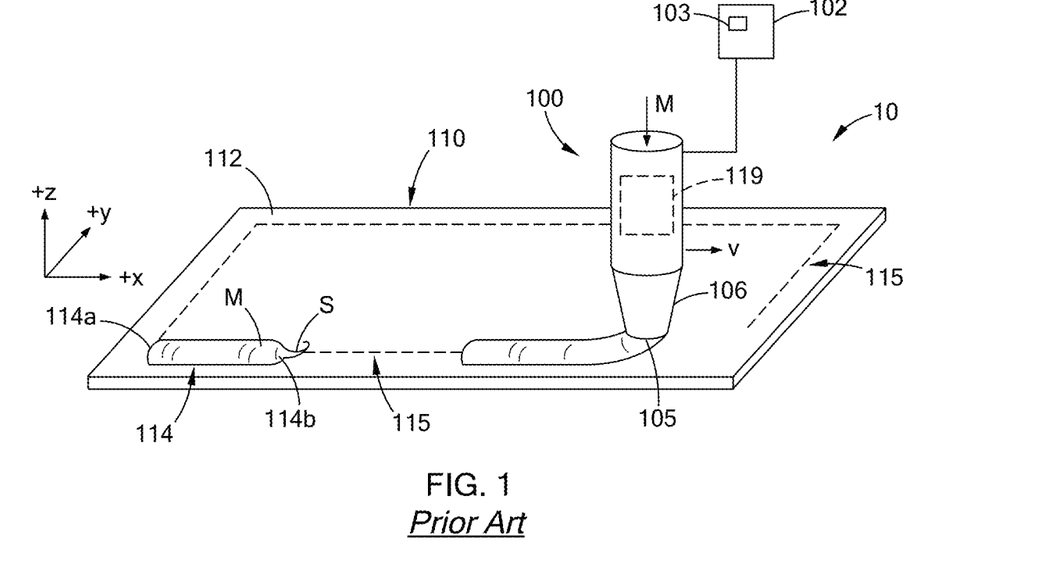
FIG. 1 is a perspective view of a material applicator dispensing a bead of adhesive on a substrate.

Referring to FIG. 1, a robotic material dispensing system 10 with a material applicator 100 for dispensing an adhesive material 'M' (referred to herein simply as "adhesive") is shown. The robotic material dispensing system 10 includes a controller 102 and a nozzle 106, and is configured to dispense the adhesive M along a predetermined path 115 on a surface 112 of a substrate 110. Particularly, the robotic material dispensing system 10 uses pressure to force the adhesive M to flow through the flow control valve 119 and the nozzle 106 such that a predefined form 114 (e.g., a bead 114) is applied on the surface 112. In addition, the robotic material dispensing system 10 is configured to dispense the adhesive M along a predetermined path 115 on the surface 112 of a substrate 110.

While FIG. 1 schematically depicts the material M flowing downwardly (−z direction) out of the nozzle 106, in some aspects of the present disclosure the material M can be dispensed from the nozzle 106 sideways (x or y directions) and/or vertically (+z direction) onto the surface 112 of the substrate 110 to form the bead 114 along the predetermined path 115. Accordingly, it should be understood that the material M is a material that flows under pressure, e.g., a liquid material.

Dispensing of the bead 114 is initiated by the controller 102 directing the flow control valve 119 to move to an open position such that, under pressure, the adhesive M starts flowing out of the nozzle 106 at a start location 114a, continues with flow of the adhesive M out of the nozzle 106 as the robotic material dispensing system 10 directs the material applicator 100 (and the nozzle 106) along the predetermined path 115, and is terminated by the controller 102 directing the flow control valve 119 to move to a closed position at a stop location 114b. In some variations, the nozzle 106 continues moving along the predetermined path 115, for example to form another bead 114 or another section of the bead 114 along the predetermined path 115 as shown in FIG. 1. However, and as shown in FIG. 1, closing the flow control valve 119 does not provide a "clean" end to the bead 114 at the stop location 114b. That is, an undesirable string 'S' of the adhesive M is formed at the stop location 114b.

Figure 2:
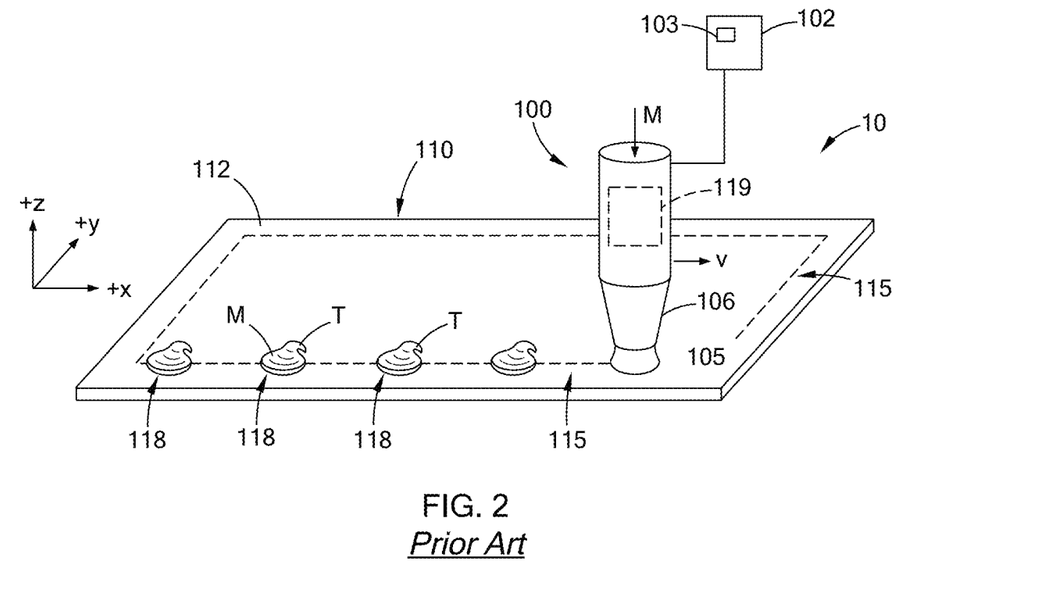
FIG. 2 is perspective view of the material applicator in FIG. 1 dispensing a button of adhesive on the substrate.

Referring to FIG. 2, in some variations the robotic material dispensing system 10 is used to dispense the material M in the form of buttons 118. For example, the robotic material dispensing system 10 directs the material applicator 100 to a predefined location on the predetermined path 115 and the flow control valve 119 opens such that the adhesive M starts flowing out of the nozzle 106 and a button 118 is formed on the surface 112. Then the flow control valve 119 closes such that the adhesive M stops flowing out of the nozzle 106 and the robotic material dispensing system 10 directs the material applicator nozzle 106 to the next predefined location on the predetermined path 115. However, and as shown in FIG. 2, an undesirable raised teardrop 'T' resulting from adhesive M folding back onto itself (rather than forming a string S) is formed on the button 118. It should be understood that a string S can also be formed when dispensing a button of adhesive on a substrate and a teardrop T can be formed at the end of a bead of adhesive formed on a substrate.

Forming of strings S during dispensing of adhesive M onto components, e.g., components on an assembly line, can result in irregularities such as contamination of class-A surfaces with string material, wash-off of string material during subsequent processes such as e-coat dipping, fouling of filters with string material, redeposit of string material onto other parts, and/or drippings of string material on the floor. Also, teardrops T can appear as cosmetic defects and such irregularities can result in additional cost due to rework, increased e-coat bath maintenance, increased housekeeping, and quality concerns, among others, and thus are undesirable.

Efforts to reduce stringing and the formation of teardrops include the use of "snuff-back" valves within the nozzle to suck back adhesive from within the nozzle and "wiper fingers" beneath a nozzle tip to break the string. However such efforts have had limited success since snuff-back valves are not tunable for different rheological and viscoelastic properties between different adhesives and/or as a function of temperature for a given adhesive. Particularly, the formation of strings and teardrops depends on several factors such as rheological and viscoelastic properties of the adhesive M and stand-off distance between a distal end of a nozzle dispensing the adhesive and a substrate on which the adhesive is being applied to.

Figure 3A:
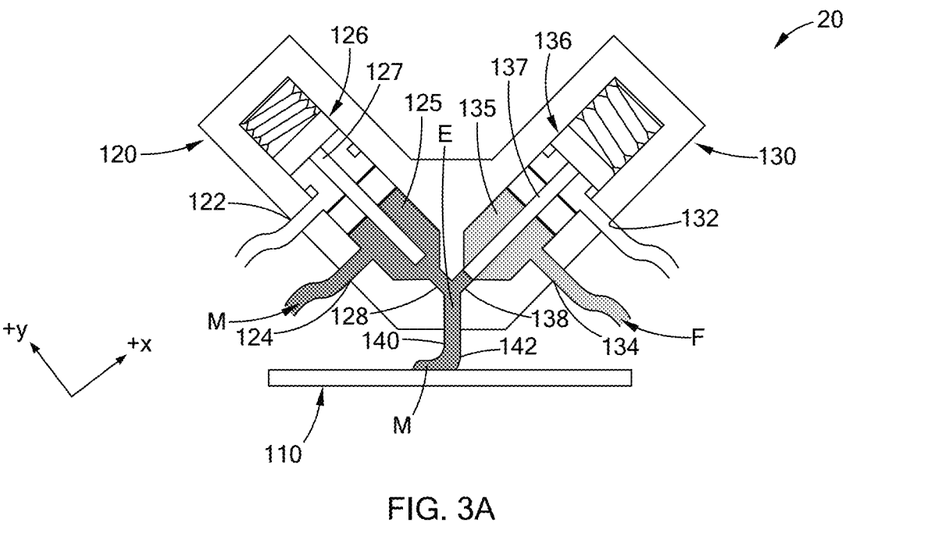
FIG. 3A is a cross-sectional view of a flow control valve according to one form of the present disclosure.
Figure 3B:
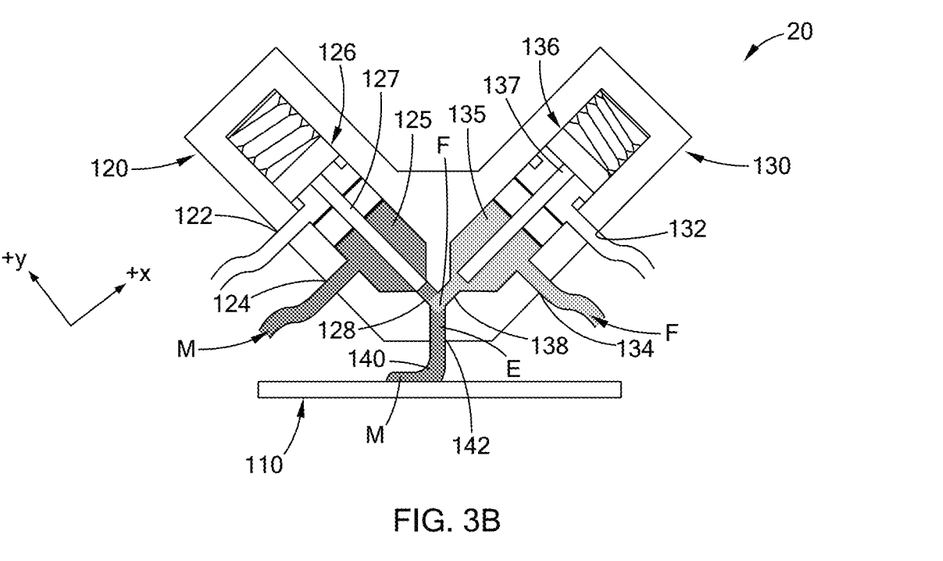
FIG. 3B is a cross-sectional view of the flow control valve in FIG. 3A with a non-adhesive fluid being introduced into an extrudate of adhesive according to the teachings of the present disclosure.

Referring now to FIGS. 3A-3D, a flow control valve 20 for dispensing adhesive M onto a substrate 110 according to one form of the present disclosure is shown. The flow control valve 20 is in the form of a Y-shaped valve with a first leg 120, a second leg 130, and an application nozzle 140. The first leg 120 includes an air inlet 122, an adhesive inlet 124, an adhesive reservoir 125, an adhesive flow valve 126, and an adhesive flow channel 128. The adhesive flow valve 126 includes a stem 127 configured to allow and stop flow of the adhesive M through the adhesive flow channel 128. That is, when the adhesive flow valve 126 is in an open position (+y direction) as shown in FIG. 3A, adhesive M flows into the adhesive reservoir 125, through the adhesive flow channel 128, and through the application nozzle 140, and when the adhesive flow valve 126 is in a closed position (−y direction) as shown in FIG. 3B, the stem 127 blocks the adhesive flow channel 128 such that the adhesive M stops flowing therethrough.

The second leg 130 includes an air inlet 132, a non-adhesive inlet 134, a non-adhesive reservoir 135, a non-adhesive flow valve 136, and a non-adhesive flow channel 138. The non-adhesive flow valve 136 includes a stem 137 configured to allow and stop flow of a non-adhesive fluid F through the non-adhesive flow channel 138. That is, when the non-adhesive flow valve 136 is in a closed position (−x direction) as shown in FIG. 3A, the stem 137 blocks the non-adhesive flow channel 138 such that the non-adhesive fluid F stops or cannot flow therethrough. And when the non-adhesive flow valve 136 is in an open position (+x direction) as shown in FIG. 3B, the non-adhesive fluid F flows into the non-adhesive reservoir 135, through the non-adhesive flow channel 138, and into an extrudate of adhesive M in the adhesive flow channel 128 and/or application nozzle 140.

Figure 3C:
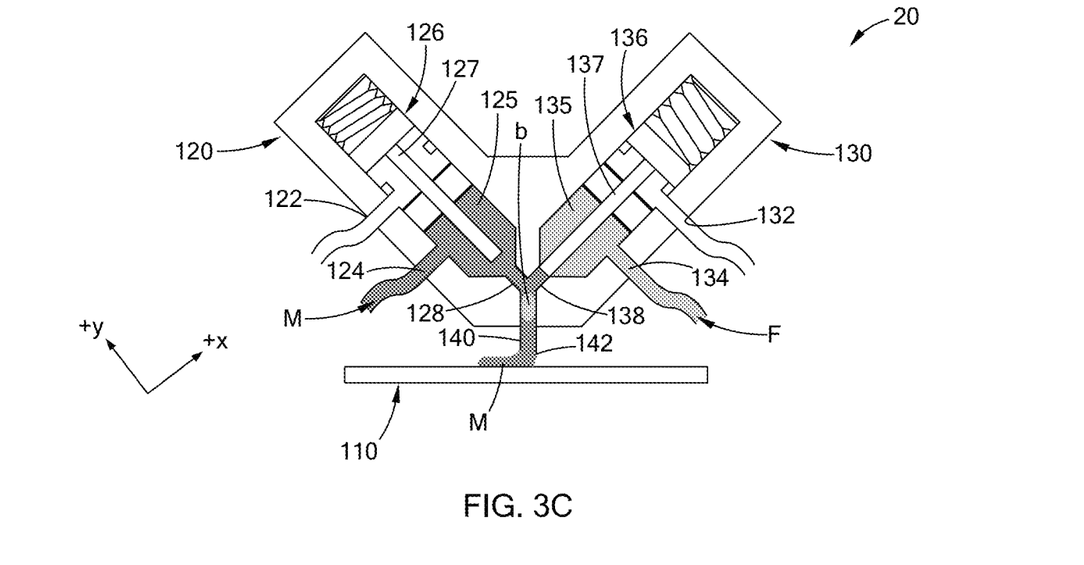
FIG. 3C is a cross-sectional view of the flow control valve in FIG. 3B with a bubble of the non-adhesive fluid in the extrudate of adhesive according to the teachings of the present disclosure.

Referring to FIG. 3C, the non-adhesive flow valve 136 is moved from the open position (FIG. 3B) back to the closed position and the adhesive flow valve 126 is moved from the closed position (FIG. 3B) back to the open position such that adhesive M begins flowing again. Stated differently, the flow control valve 20 returns to an "open position" such that the adhesive M begins flowing again through the adhesive reservoir 125 and the adhesive flow channel 128. Also, introducing or injecting the non-adhesive fluid F in the extrudate E forms a bubble 'b' within the extrudate E of the adhesive M, and the bubble b flows or moves with the extrudate E as the adhesive M flows through the application nozzle 140.

Figure 3D:
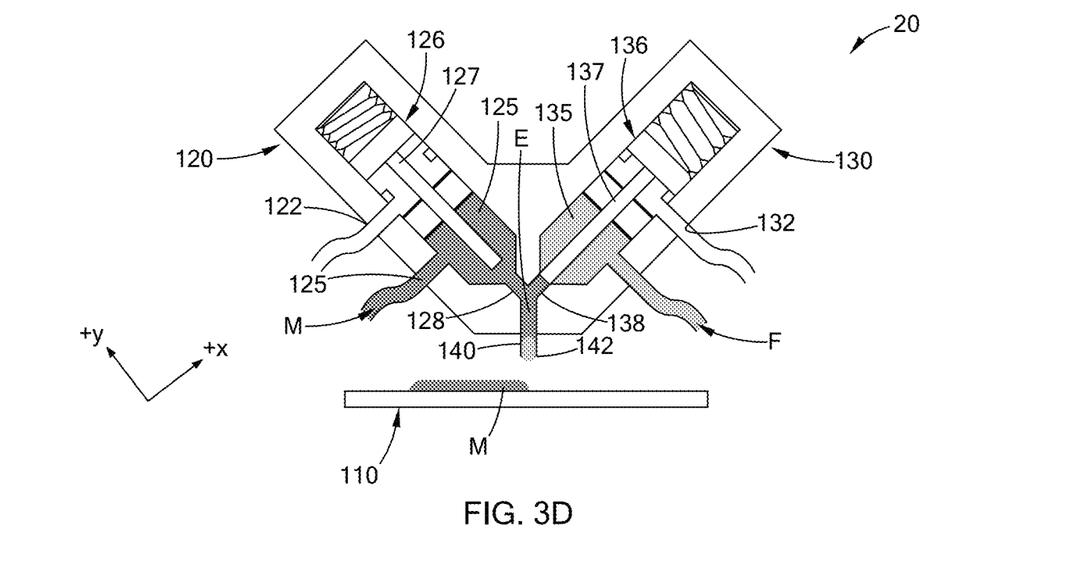
FIG. 3D is a cross-sectional view of the flow control valve in FIG. 3C with the bubble of the non-adhesive fluid having formed a non-contact cut of the extrudate of adhesive.

Referring to FIG. 3D, continued flow of the adhesive M through the application nozzle 140 results in the bubble b of the non-adhesive fluid F reaching a distal end 142 of the application nozzle 140. In addition, the bubble b of the non-adhesive fluid F interrupts a boundary layer of the extrudate E such that a non-contact clean cut (e.g., no string or teardrop formation) of the extrudate E is provided. Stated differently, injecting the non-adhesive fluid F into the extrudate E of the adhesive M inhibits (e.g., prevents) forming or formation of a string S and/or a teardrop T.

Figure 5:
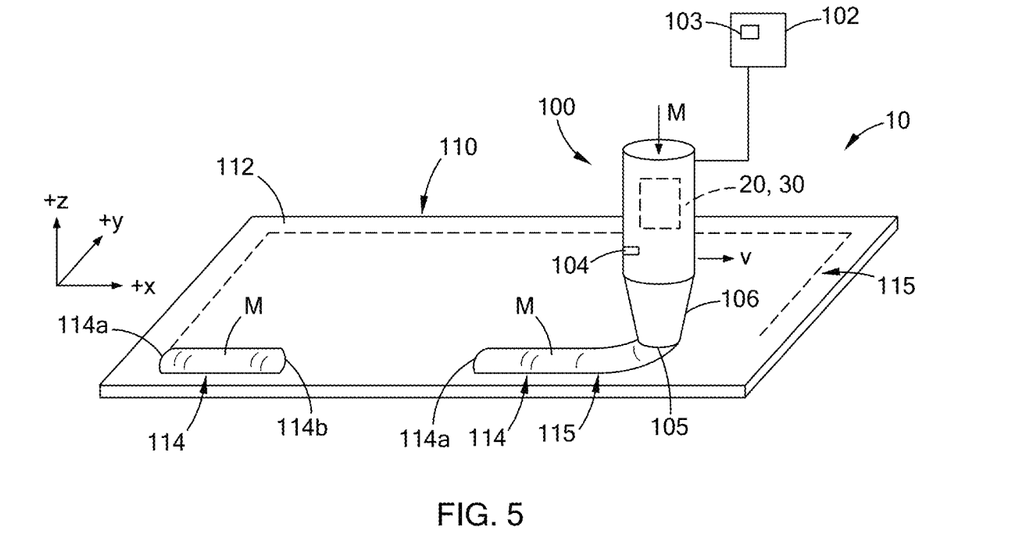
FIG. 5 is a perspective view of the material applicator in FIG. 1 with a flow control valve according to the teachings of the present disclosure dispensing a bead of adhesive on a substrate.

During operation of the robotic material dispensing system 10 to form a bead Be, adhesive flow valve 126 is in the open position and non-adhesive flow valve 136 is in the closed position such that the adhesive M flows through the application nozzle 140 while the nozzle 106 moves along a predefined path and the bead 114 is formed on the substrate 110. As a predefined end of the bead 114 is approached, adhesive flow valve 126 moves to the closed position (e.g., via direction from the controller 102), non-adhesive flow valve 136 moves to the open position (e.g., via direction from the controller 102), and a desired amount of non-adhesive fluid F is introduced into the extrudate E of adhesive M upstream of the distal end 142 of the application nozzle 140. In some variations, the desired amount of non-adhesive fluid F is introduced into the extrudate E of adhesive M downstream of the adhesive flow valve 126 and upstream of the distal end 142 of the application nozzle 140. And after the desired amount of non-adhesive fluid F is introduced into the extrudate E of adhesive M, adhesive flow valve 126 moves back to the open position, non-adhesive flow valve 136 moves back to the closed position, and adhesive M starts flowing again until the non-adhesive fluid F reaches the distal end 142 of the application nozzle 140, a clean cut of the extrudate E is provided, and a string S at the end of the bead 114 is avoided as shown in FIG. 5.

Figure 6:
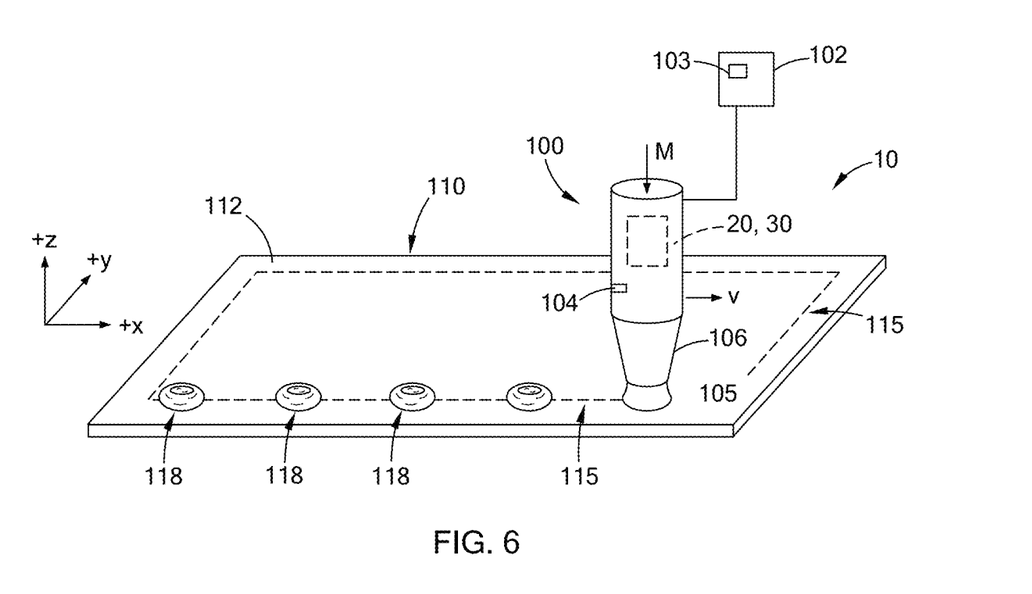
FIG. 6 is perspective view of the material applicator in FIG. 1 with a flow control valve according to the teachings of the present disclosure dispensing a button of adhesive on a substrate.

Also, during operation of the robotic material dispensing system 10 to form a button 118, the material applicator 100 moves to a predefined position on the substrate 110 and stops, and adhesive flow valve 126 moves to the open position (e.g., via direction from the controller 102), with non-adhesive flow valve 136 in the closed position (e.g., via direction from the controller 102), such that the adhesive M flows through and out of the application nozzle 140 at the predefined position onto the substrate 110. As completion of forming of the button 118 is approached, adhesive flow valve 126 moves to the closed position, non-adhesive flow valve 136 moves to the open position, and a desired amount of non-adhesive fluid F is introduced into the extrudate E of adhesive M. And after the desired amount of non-adhesive fluid F is introduced into the extrudate E of adhesive M, adhesive flow valve 126 moves back to the open position, non-adhesive flow valve 136 moves back to the closed position, and adhesive M starts flowing again until the non-adhesive fluid F reaches the distal end 142 of the application nozzle 140, a clean cut of the extrudate E is provided, and a teardrop T on the button 118 is avoided as shown in FIG. 6.

It should also be understood that in some variations, the application nozzle 140 is not completely purged of the adhesive M after dispensing of a bead or button since such a purge can result in splatter of the adhesive M at the end of a bead and/or button, along with a delay at the start of dispensing a subsequent bead and/or button. Also, the volume of the bubble 'b' is adjustable by controlling the open time for the non-adhesive flow valve 136 such that different nozzle sizes and/or properties of the adhesive M such as viscosity, cohesive wet strength, among others are accommodated for. Accordingly, synchronization of the two valves 126, 136 ensures the bubble 'b' reaches the distal end 142 of the application nozzle 140 at the end of forming or dispensing a desired bead 114 and/or button 118 when the non-adhesive flow valve 136 moves to the closed position. In addition, the controller 102 is configured to open and close the two valves 126, 136 such that different rheological and viscoelastic properties between different adhesives and/or as a function of temperature for a given adhesive are accounted for. For example, the controller 102 can include a memory 103 with a look-up table for synchronization of the two valves 126, 136 with respect to a given adhesive M and its rheological and viscoelastic properties. Also, the material applicator 100 can include a temperature sensor 104 configured to transmit a temperature signal for a current temperature of the adhesive M (flowing through the flow control valve 20) to the controller 102, and the controller 102 is configured to synchronize the two valves 126, 136 and accommodate for changing rheological and viscoelastic properties of the adhesive M as a function of its temperature.

Figure 4A:
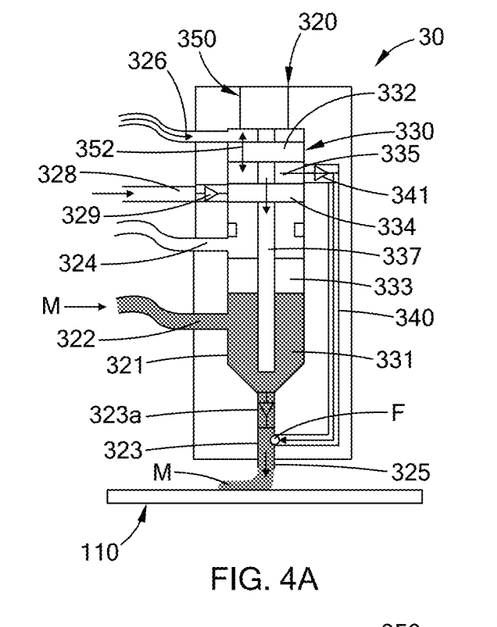
FIG. 4A is a cross-sectional view of a flow control valve according to another form of the present disclosure.
Figure 4B:
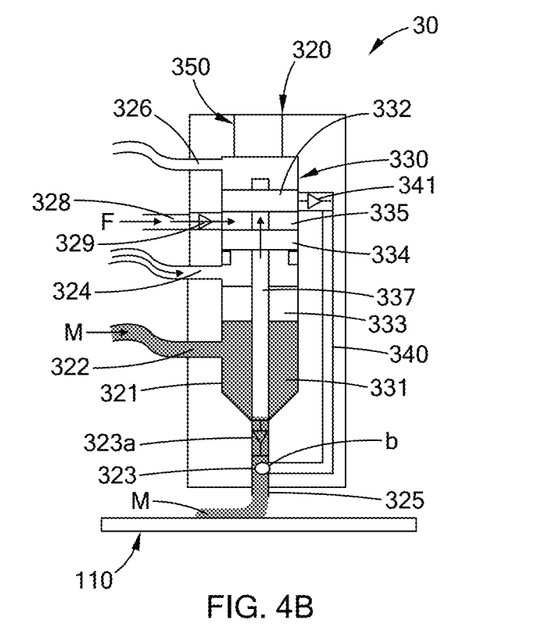
FIG. 4B is a cross-sectional view of the flow control valve in FIG. 4A with a non-adhesive fluid being introduced into an extrudate of adhesive according to the teachings of the present disclosure.
Figure 4C:
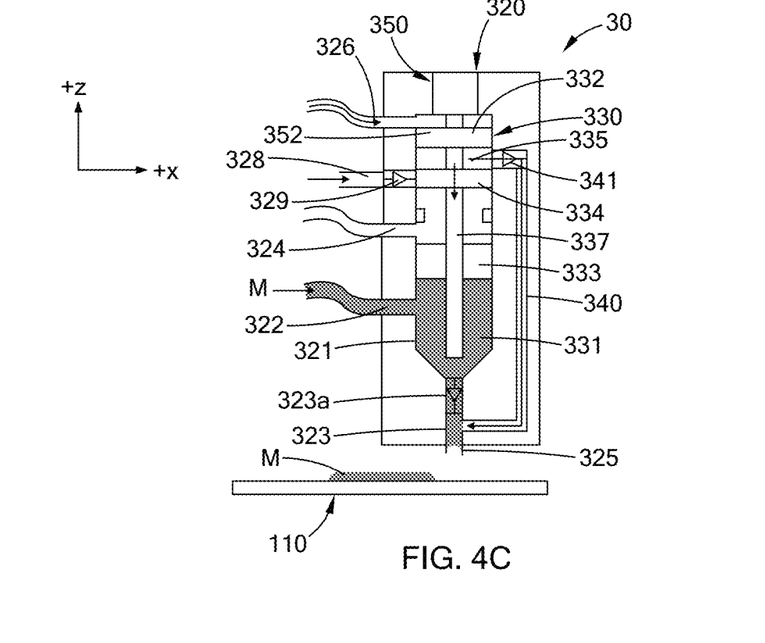
FIG. 4C is a cross-sectional view of the flow control valve in FIG. 4B with a bubble of the non-adhesive fluid providing a non-contact cut of the extrudate of adhesive.

Referring now to FIGS. 4A-4C, a flow control valve 30 for dispensing adhesive M onto a substrate 110 according to another form of the present disclosure is shown. The flow control valve 30 includes a housing 320, a cylinder 321 and an adhesive flow valve 330. The cylinder 321 has an adhesive inlet 322, an valve-open inlet 324, a valve-close inlet 326, and a non-adhesive inlet 328 with a one-way valve 329 (e.g., a check valve). The adhesive flow valve 330 includes a pair of pistons 332, 334, and a stem 337 extending from the pair of pistons 332, 334 and through a divider disc 333 of the cylinder 321. An adhesive reservoir 331 is defined below the divider disc 333 of the cylinder 321, a working chamber 335 is defined above the divider disc 333, for example, between the pair of pistons 332, 334 of the adhesive flow valve 330, and an application nozzle 323 extends from the adhesive reservoir 331 to a distal end 325 where adhesive M flows out of the flow control valve 30.

In some variations a working chamber adjuster 350 (referred to herein simply as "adjuster 350") is included and configured to adjust the volume of the working chamber 335. For example, in at least one variation the adjuster 350 is an aperture with a sealable plug that is sized or configured for a tool such as a screwdriver or socket wrench (not shown) to extend through. In such variations, the piston 334 shown in FIG. 4A is threaded onto the stem 337 such that rotating of the piston 334 moves the piston 334 in an upward direction (+z direction) or a downward direction (-z direction) as indicated by the double-headed arrow 352. In addition, it should be understood that moving the piston 334 in the upward direction and the downward direction adjusts or changes the volume of the working chamber 335. In at least one variation the piston 334 and stem 337 include a locking feature (e.g., a lock nut) such that after desired rotation of the piston 334 on the stem 337, the piston 334 is inhibited from rotating during use or operation of the flow control valve 30. In some variations, the adjuster 350 is an actuator (e.g., a rotary actuator) configured to accept commands from a controller (e.g., controller 102) and rotate the piston 334 such that the piston 334 moves in the upward direction or downward direction and thereby adjusts the volume of the working chamber 335.

A non-adhesive flow channel 340 extends from the working chamber 335 to the application nozzle 323 and a non-adhesive flow valve 341 (e.g., a one-way valve) is included and provided one-way flow of a non-adhesive F from the working channel 335 to the application nozzle 323. As shown in FIGS. 4A-4C, the non-adhesive flow channel 340 is separate from and bypasses the adhesive reservoir 331.

During operation of the flow control valve 30 to form a bead 114, a gas such as air flows through the valve-open inlet 324 (e.g., via direction from the controller 102) such that the adhesive flow valve 330 moves to an open position (+z direction) and the stem 337 is not blocking the application nozzle 323, and adhesive M flows into the adhesive reservoir 331, through the application nozzle 321, and onto the substrate 110 while the flow control valve 30 moves along a predefined path and the bead 114 is formed (FIG. 4A). As a predefined end of the bead 114 is approached, air flows through the valve-closed inlet 326 (e.g., via direction from the controller 102) such that the adhesive flow valve 330 moves to a closed position (-z direction) and the stem 337 blocks the application nozzle 323 (FIG. 4B). As the adhesive flow valve 330 moves to the closed position, a desired amount of non-adhesive fluid F in the working chamber 335 is forced through the non-adhesive flow valve 341, through the non-adhesive flow channel 340, and into the extrudate E of adhesive M in the application nozzle 323 (FIG. 4B). After the desired amount of non-adhesive fluid F is introduced into the extrudate E of adhesive M, air flows through the valve-open inlet 324 such that the adhesive flow valve 330 moves back to an open position (+z direction) and the stem 337 is not blocking the application nozzle 323. And adhesive M flows into the adhesive reservoir 331 and through the application nozzle 323 until the non-adhesive fluid F reaches the distal end 325 of the application nozzle 323, a clean cut of the extrudate E is provided (FIG. 4C), and a string S at the end of the bead 114 is avoided as shown in FIG. 5.

During operation of the flow control valve 30 to form a button 118, the flow control valve 30 moves to a predefined position on the substrate 110 and stops. Air flows through the valve-open inlet 324 such that the adhesive flow valve 330 moves to an open position (+z direction) and the stem 337 is not blocking the application nozzle 323, and adhesive M flows into the adhesive reservoir 331 and through the application nozzle 323 at the predefined position on the substrate 110. As completion of forming the button 118 is approached, air flows through the valve-closed inlet 326 such that the adhesive flow valve 330 moves to a closed position (-z direction) and the stem 337 blocks the application nozzle 323. As the adhesive flow valve 330 moves to the closed position, a desired amount of non-adhesive fluid F in the working chamber 335 is forced through the non-adhesive flow valve 341, through the non-adhesive flow channel 340, and into the extrudate E of adhesive M in the application nozzle 323. After the desired amount of non-adhesive fluid F is introduced into the extrudate E of adhesive M, air flows through the valve-open inlet 324 such that the adhesive flow valve 330 moves back to an open position (+z direction) and the stem 337 is not blocking the application nozzle 323, and adhesive M flows into the adhesive reservoir 331 and through the application nozzle 323 until the non-adhesive fluid F reaches the distal end 325 of the application nozzle 323, a clean cut of the extrudate E is provided, and a teardrop T on the button is avoided as shown in FIG. 6.

It should be understood that in some variations, the application nozzle 323 is not completely purged of the adhesive M since such a purge can result in splatter of the adhesive M at the end of a bead and/or button, along with a delay at the start of dispensing a subsequent bead and/or button. Also, the volume of the bubble 'b' is adjustable by controlling the pressure of the non-adhesive fluid F in the working chamber 335 and/or adjusting the volume of the working chamber 335 as discussed above such that different nozzle sizes and/or properties of the adhesive M such as viscosity, cohesive wet strength, among others are accommodated for. Accordingly, synchronization of the adhesive flow valve 330 from the open position to the closed position ensures the bubble 'b' reaches the distal end 325 of the application nozzle 323 forming or dispensing a desired bead and/or button when the adhesive flow valve 330 moves to the closed position. For example, the controller 102 with the memory 103 and look-up table can synchronize movement of the adhesive flow valve 330, pressure of the non-adhesive fluid F and/or the volume of the working chamber 335 with respect to a given adhesive M and its rheological and viscoelastic properties. Also, the temperature sensor 104 can be configured to transmit a temperature signal for a current temperature of the adhesive M (flowing through the flow control valve 30) to the controller 102, and the controller 102 is configured to synchronize movement of the adhesive flow valve 330, pressure of the non-adhesive fluid F and/or the volume of the working chamber 335 and thereby accommodate for changing rheological and viscoelastic properties of the adhesive M as a function of its temperature.

Figure 7A:
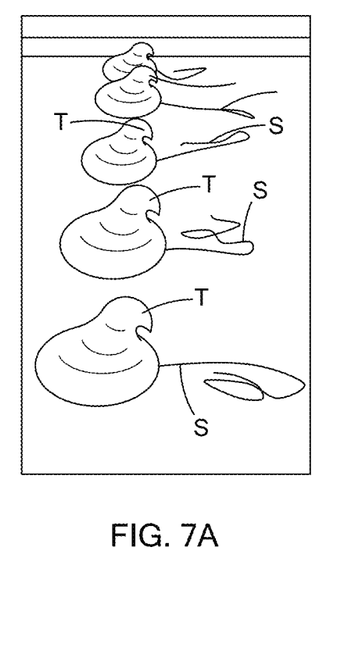
FIG. 7A is a photograph of a plurality of buttons dispensed onto a substrate using a material applicator according to the prior art.
Figure 7B:
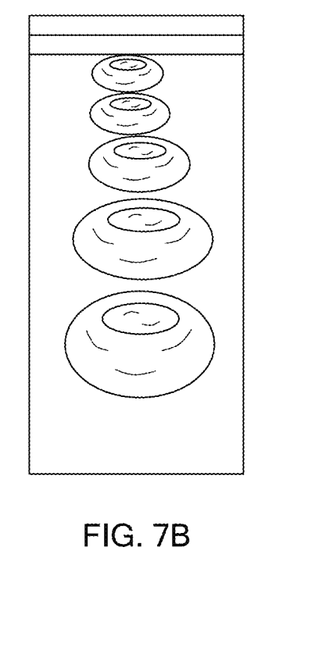
FIG. 7B is a photograph of a plurality of buttons dispensed onto a substrate using a material applicator with a flow control valve according to the teachings of the present disclosure.

Referring now to FIGS. 7A and 7B, a photograph of buttons formed with a traditional fluid control nozzle is shown in FIG. 7A and a photograph of buttons formed with a flow control valve according to the teachings of the present disclosure is shown in FIG. 7B. As observed in FIG. 7A, each of the buttons have a teardrop T and a string S. In contrast, the buttons in FIG. 7B are free of teardrops T and strings S. Accordingly, enhanced flow control with clean non-contact cuts of adhesive are provided by the teachings of the present disclosure.

Non-limiting examples of the non-adhesive fluid F include air, nitrogen, liquids that readily evaporate (e.g., a solvent), and others.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of dispensing an adhesive on a substrate, the method comprising:
flowing an extrudate of the adhesive through a flow control valve and an application nozzle; and
introducing a non-adhesive fluid into the extrudate within the flow control valve upstream from a distal end of the application nozzle, wherein the non-adhesive fluid interrupts a boundary layer of the extrudate upstream from the distal end of the application nozzle such that a non-contact cut of the extrudate is provided.

2. The method according to claim 1, wherein the non-adhesive fluid is air.

3. The method according to claim 1, wherein the non-adhesive fluid forms a bubble in the extrudate of the adhesive flowing through the application nozzle.

4. The method according to claim 1, wherein the non-adhesive fluid is a liquid.

5. The method according to claim 1, wherein the non-adhesive fluid introduced into the extrudate of the adhesive forms an air bubble between an adhesive reservoir within the flow control valve and a distal end of the application nozzle.

6. The method according to claim 5 further comprising flowing the extrudate of the adhesive downstream of the air bubble out of the application nozzle.

7. The method according to claim 6, wherein the adhesive dispensed onto the substrate is free of an adhesive string.

8. The method according to claim 6, wherein the adhesive dispensed onto the substrate is free of a teardrop.

9. The method according to claim 1, wherein the flow control valve comprises an adhesive flow valve and a non-adhesive flow valve.

10. The method according to claim 9, wherein the non-adhesive fluid introduced into the extrudate of the adhesive flows through the non-adhesive flow valve and into the extrudate downstream of the adhesive flow valve and upstream from a distal end of the application nozzle.

11. The method according to claim 10, wherein the adhesive flow valve moves from an open position to a closed position before the non-adhesive flow valve moves from a closed position to an open position.

12. The method according to claim 11, wherein a timing between moving the adhesive flow valve from the open position to the closed position and moving the non-adhesive flow valve from the closed position to the open position is adjusted as a function of at least one fluid property of the adhesive.

13. The method according to claim 12, wherein the timing between moving the adhesive flow valve from the open position to the closed position and moving the non-adhesive flow valve from the closed position to the open position is adjusted by a controller.

14. The method according to claim 13, wherein the controller adjusts the timing between moving the adhesive flow valve from the open position to the closed position and moving the non-adhesive flow valve from the closed position to the open position as a function of a temperature of the extrudate of the adhesive flowing through the flow control valve and the application nozzle.

15. The method according to claim 1, wherein at least one of a timing of introducing the non-adhesive fluid into the extrudate and a volume of the non-adhesive fluid introduced into the extrudate is adjusted in real-time as a function of a temperature of the extrudate.

16. A method of dispensing adhesive on a substrate, the method comprising:
flowing an extrudate of the adhesive through a flow control valve and an application nozzle; and
flowing air through a non-adhesive flow valve and introducing the air into the extrudate within the flow control valve and upstream a distal end of the application nozzle, wherein the air interrupts a boundary layer of the extrudate upstream from the distal end of the application nozzle such that a non-contact cut of the extrudate is provided.

17. The method according to claim 16, wherein the flow control valve comprises an adhesive flow valve, and further comprising moving the adhesive flow valve from an open position to a closed position and moving the adhesive flow valve from a closed position to an open position such that the air introduced into the extrudate forms an air bubble in the extrudate flowing within the flow control valve and the application nozzle.

18. The method according to claim 17 further comprising a controller adjusting a timing between moving the adhesive flow valve from the open position to the closed position and moving the non-adhesive flow valve from the closed position to the open position as a function of at least one fluid property of the adhesive.

19. A method of dispensing adhesive on a substrate, the method comprising:
flowing an extrudate of the adhesive through a flow control valve and an application nozzle, wherein the flow control valve comprises an adhesive flow valve and a non-adhesive flow valve;
moving the adhesive flow valve from an open position to a closed position;
moving the non-adhesive flow valve from a closed position to an open position and flowing a gas through the non-adhesive flow valve and into the extrudate downstream of the adhesive flow valve and upstream from a distal end of the application nozzle; and
moving the non-adhesive flow valve from the open position to the closed position and moving the adhesive flow valve from the closed position to the open position such that the gas flowing into the extrudate interrupts a boundary layer of the extrudate upstream from the distal end of the application nozzle such that a non-contact cut of the extrudate is provided.

20. The method according to claim 19, wherein a timing between moving the adhesive flow valve from the open position to the closed position and moving the non-adhesive flow valve from the closed position to the open position is adjusted as a function of at least one fluid property of the adhesive flowing through the adhesive flow valve.

* * * * *